L. A. GRIFFIN.
FITTING FOR PIPE CONVEYER SYSTEMS.
APPLICATION FILED APR. 8, 1918.
1,300,380.
Patented Apr. 15, 1919.
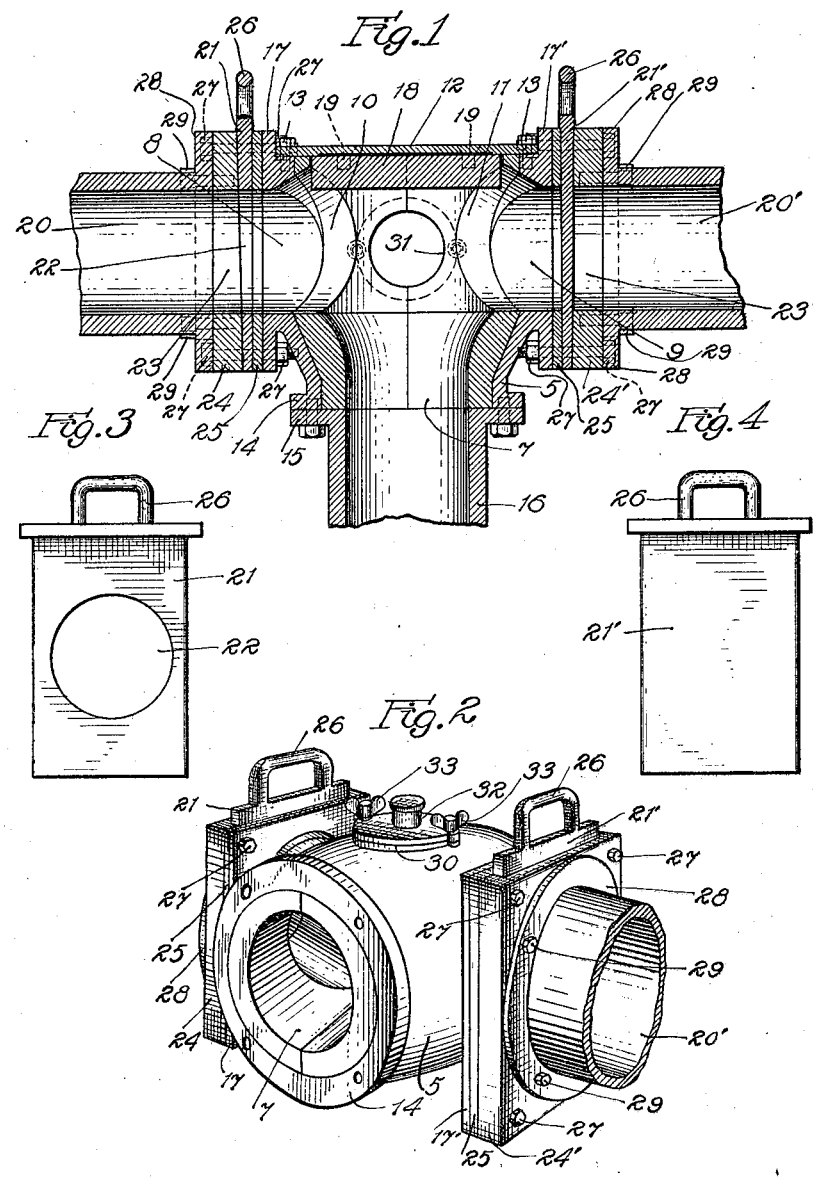
Witnesses:
Andrew Wintercorn
Earl F. Pierce
Inventor
Lorne A. Griffin
By Williams, Bradbury & Lee
Attys.

UNITED STATES PATENT OFFICE.

LORNE A. GRIFFIN, OF EVANSTON, ILLINOIS, ASSIGNOR TO AMERICAN STEAM CONVEYOR CORPORATION, OF CHICAGO, ILLINOIS, A CORPORATION OF NEW YORK.

FITTING FOR PIPE CONVEYER SYSTEMS.

1,300,380.  Specification of Letters Patent.  Patented Apr. 15, 1919.

Application filed April 8, 1918. Serial No. 227,230.

*To all whom it may concern:*

Be it known that I, LORNE A. GRIFFIN, a citizen of the United States, residing at Evanston, in the county of Cook and State of Illinois, have invented certain new and useful Improvements in Fittings for Pipe Conveyer Systems, of which the following is a full, clear, concise, and exact description, reference being had to the accompanying drawings, forming a part of this specification.

This invention relates to improvements in fittings for pipe conveyer systems and is especially concerned with the provision of a new and improved fitting for pipe conveyer systems of that type in which pneumatic or other fluid pressure is used for conveying various kinds of comminuted abrasive material through the conveyer pipe system.

The objects of the invention are, first, to provide a fitting of the character referred to to be placed at points in the pipe conveyer system at which it is desired to change the direction of flow of the material being conveyed in the pipe system, means being provided for discharging the material from the fitting in any one of a plurality of different directions, and other means being provided for controlling the direction of flow through the discharge pipes.

A further object of my invention is to provide novel means for controlling the flow of the material through the discharge pipes comprising slidable gates, and means for receiving these gates, the latter means being adjustable about the axes of the discharge openings in order to permit the gates to be inserted from different sides of the discharge pipes or conduits.

Other objects, adaptabilities, and capabilities will appear as the description progresses, reference being had to the accompanying drawings in which, Figure 1 is a longitudinal section through my improved fitting showing sections of conduits connected thereto;

Fig. 2 is a perspective view of the fitting in which the gate guide blocks are shown in a position at right angles to the positions which they occupy in Fig. 1; and Figs. 3 and 4 are side elevations of the gates used for controlling the flow of material through the discharge openings.

Similar characters of reference refer to similar parts throughout the several views.

Referring to the drawings, the reference character 5 indicates a hollow body member which is provided with a pair of oppositely disposed end openings 6 and 7 respectively, and a pair of lateral discharge openings 8 and 9 respectively. Slidably mounted within the interior of the body member 5 are a pair of complementary wear liners 10 and 11 respectively, which may be withdrawn from the body member through the end opening 6. The lower ends of these wear members are conformed to the tapering bore of the body member so as to prevent these members from being displaced through the opening 7. For retaining the wear liners 10 and 11 in position I provide a cover plate 12 which may be secured to the body member so as to engage the ends of the wear liners 10 and 11 and hold these members in place by means of screws 13 which are received in suitable screwthreaded openings in the body member. The body member is provided with a flange 14 which surrounds the opening 7 and to which may be bolted the flange 15 of the intake conduit 16. The body member is also provided with flanges 17 and 17' which surround the openings 8 and 9 respectively, which constitute the discharge openings of the fitting.

In order to prevent the cover plate 12 from being worn through by the impact of the abrasive material thereon I secure an impact plate 18 thereto by means of screws 19 so that the impact plate may be removed when worn through by the action of the material being conveyed.

The discharge openings 8 and 9 communicate with discharge conduits 20 and 20' respectively. For controlling the flow of material through the conduits 20 and 20' I provide a pair of gates 21 and 21'. the gate 21 being provided with an aperture 22 to permit the flow of material therethrough and the gate 21' being imperforate to provide a means for closing either conduit with which it is associated. For receiving and holding the gates 21 and 21' in operative position relative to the conduits with which they are employed, I provide a pair of gate guide blocks 23 and 23' respectively, each of which comprises a member 24 having a recess in one side thereof which decreases in depth toward the opposite side. This recess is closed by a second member 25 which forms with the first-named member a tapered seat for receiving the gates, which also taper in thickness toward one end, the opposite ends of the gates being provided with handles 26.

The guide blocks thus formed are secured to the flanges 17 and 17' respectively by means of bolts 27, as shown in Fig. 2, and the flanges 28 of the conduits 20 and 21 are secured to the members 24 by means of screws 29. It frequently happens in installations of the kind with which my improved fitting is intended to be used, that it is impossible to withdraw the gates from the guide blocks in any desired direction, but by providing the gate guide blocks described above which are separate from the body member and the conduit flanges, I have provided means whereby the gates may be withdrawn in one of four different directions, for the reason that the screws 27 may be withdrawn and the guide blocks shifted about the axis of the conduits until they are in a position which will permit the gates to be withdrawn. For this purpose it is of course necessary that the apertures or holes for receiving the bolts 27 should be equally spaced. The members forming the guide blocks are of course provided with apertures registering with the corresponding apertures in the body member and with the conduits.

It is believed that the operation of my improved fitting will be apparent from the above description. The gate 21' prevents the flow of material through one discharge conduit and the gate 21 permits the flow through the other. These gates may be interchanged to reverse the direction of flow of the material or another gate 21 may be provided for permitting discharge of material through both conduits, and in a similar manner another gate 21' may be provided for preventing the flow of material through both conduits if so desired.

For the purpose of inspection I have provided the body member with a hand hole 30, which registers with a corresponding opening 31 formed in the liners 10 and 11. For closing this member I provide a cover plate 32, which is provided with an inner end that is flush with the inner surfaces of the wear liners 10 and 11. This cover plate is held in place by means of wing nuts 33 co-acting with stud bolts secured to the body member and projecting through suitable openings in the cover plate.

While I have described the guide blocks as being formed from two different parts, it is to be understood that my invention is, not limited to this particular structure but that the guide blocks may be formed of a single member. They are, however, preferably formed of two members, as this facilitates the manufacture of the guide blocks. It will also be understood that I may employ other means for securing the adjustment of the guide blocks relative to the body member. The wear liners and impact plates of my improved fitting are preferably formed from hard cast iron but may be formed from any other material suitable for this purpose.

Having thus described my invention, what I claim as new and desire to secure by Letters Patent of the United States is:

1. The combination with a hollow body member having alined end openings and a plurality of lateral openings, of a pair of complementary wear linings having openings registering with the openings in said body member, and an impact plate closing one of said end openings, and detachable means for holding said impact plate in position.

2. The combination with a hollow body member having alined end openings and a plurality of lateral openings, of a wear lining having openings registering with the openings in said body member, and an impact plate for closing one end opening, the said wear lining being withdrawable through the end opening closed by said impact plate.

3. The combination with a hollow body member having alined end openings and a plurality of lateral openings, of a wear lining having openings registering with the openings in said body member, and an impact plate for closing one end opening.

4. The combination with a hollow body member having a plurality of openings opening thereinto at an angle to each other, of a wear lining having openings registering with the openings in said body member, an impact plate for closing one of said openings, and gates for controlling the flow through certain of said openings.

5. The combination with a hollow body member having a plurality of openings opening thereinto at an angle to each other, of a wear lining having openings registering with the openings in said body member, and an impact plate for closing one of said openings.

6. The combination with a hollow body member having an inlet opening and a plurality of discharge openings opening thereinto at an angle to said inlet opening, of a removable wear liner having openings registering with the openings in said body member, an impact plate located in the line of discharge of said inlet opening, apertured guide blocks, means for adjustably securing said guide blocks to said body member in registry with said discharge openings, and means for controlling the flow through said discharge openings comprising perforate and imperforate gates coacting with said gate guide blocks.

7. The combination with a hollow body member having an inlet opening and a plurality of discharge openings opening thereinto at an angle to said inlet opening, of a removable wear liner having openings registering with the openings in said body member, an impact plate located in the line of discharge of said inlet opening, apertured guide blocks, means for adjustably securing said guide blocks to said body member in registry with said discharge openings, and means for controlling the flow through said discharge openings comprising gates co-acting with said gate guide blocks.

8. The combination with a hollow body member having an inlet opening and a plurality of discharge openings opening thereinto at an angle to said inlet opening, of a removable wear liner having openings registering with the openings in said body member, an impact plate located in the line of discharge of said inlet opening, apertured guide blocks, means for adjustably securing said guide blocks to said body member in registry with said discharge openings, and means for controlling the flow through said discharge openings.

9. The combination with a hollow body member having an inlet opening and a plurality of discharge openings, of means for controlling the flow through said discharge openings, comprising an apertured gate guide block for each discharge opening having a gate seat formed therein, means for adjustably securing said guide blocks to said body member in registry with said discharge openings, to permit said guide blocks to be adjusted about the axis of said discharge openings, and interchangeable perforate and imperforate gates for co-acting with said gate seats.

10. The combination with a hollow body member having an inlet opening and a plurality of discharge openings, of means for controlling the flow through said discharge openings, comprising an apertured gate guide block for each discharge opening having a gate seat formed therein, means for adjustably securing said guide blocks to said body member in registry with said discharge openings, to permit said guide blocks to be adjusted about the axis of said discharge openings, and gates for co-acting with said gate seats.

11. The combination with a hollow body member having inlet and discharge openings, of means for controlling the flow through one of said openings, comprising a gate guide block having a gate seat and an aperture for registering with said opening, means for adjustably securing said guide block to said body member in registry with said opening, to permit said guide block to be adjusted about the axis of said opening, and a gate for co-acting with said seat.

12. The combination with a hollow body member having inlet and discharge openings, of means for controlling the flow through one of said openings, comprising a gate, and means adjustably secured to said body member for holding said gate in coacting relation with said opening, said means permitting the gate to be adjusted about the axis of said opening.

13. The combination with a hollow body member having inlet and discharge openings, of means for controlling the flow through one of said openings, comprising two members, one of said members being provided with a recess closed by the other of said members to form a gate seat extending inwardly from one edge thereof and decreasing in depth toward the inner end, the said members being provided with registering openings opening into said recess, means for securing said members to said gate member to permit their adjustment about the axis of said opening, and a gate tapered longitudinally for co-acting with said gate seat.

14. The combination with a hollow body member having inlet and discharge openings, of means for controlling the flow through one of said openings, comprising two members, one of said members being provided with a recess closed by the other of said members to form a gate seat extending inwardly from one edge thereof, the said members being provided with registering openings opening into said recess, means for adjustably securing said members to said gate member to permit their adjustment about the axis of said opening, and a gate for co-acting with said gate seat.

15. The combination with a hollow body member having inlet and discharge openings, of means for controlling the flow through one of said openings, comprising a gate guide block having a recess extending inwardly from one edge thereof and decreasing in depth toward the inner end, the said block being provided with an opening opening into said recess, a gate tapered longitudinally for co-acting with said recess, and means for adjustably securing said block to said body member in registry with said opening, to permit it to be adjusted about the axis of said opening.

16. The combination with a hollow body member having inlet and discharge openings, of means for controlling the flow through one of said openings, comprising a gate guide block having a recess extending inwardly from one edge thereof, the said block being provided with an opening opening into said recess, a gate for co-acting with said recess, and means for adjustably securing said block to said body member in registry with said opening, to permit it to be adjusted about the axis of said opening.

In witness whereof, I hereunto subscribe my name this 3rd day of April, A. D. 1918.

LORNE A. GRIFFIN.

Witnesses:
EARL F. PEIRCE,
EARL T. COOK.

Copies of this patent may be obtained for five cents each, by addressing the "Commissioner of Patents, Washington, D. C."